(12) United States Patent
Hessbrüggen

(10) Patent No.: US 7,493,687 B2
(45) Date of Patent: Feb. 24, 2009

(54) FLEXIBLE TRANSFER MACHINE

(75) Inventor: Norbert Hessbrüggen, Salach (DE)

(73) Assignee: Emag Holding GmbH, Salach (DE)

( * ) Notice: Subject to any disclaimer, the term of this patent is extended or adjusted under 35 U.S.C. 154(b) by 111 days.

(21) Appl. No.: 11/658,197

(22) PCT Filed: Jun. 8, 2005

(86) PCT No.: PCT/DE2005/001018

§ 371 (c)(1),
(2), (4) Date: Jan. 22, 2007

(87) PCT Pub. No.: WO2006/010351

PCT Pub. Date: Feb. 2, 2006

(65) Prior Publication Data

US 2008/0000072 A1   Jan. 3, 2008

(30) Foreign Application Priority Data

Jul. 21, 2004   (DE) ...................... 10 2004 035 360

(51) Int. Cl.
*B23Q 7/16* (2006.01)
(52) U.S. Cl. ...................................... 29/563
(58) Field of Classification Search .................. 29/563, 29/558, 26 A; 408/3, 44, 45, 53, 69, 70; 409/84, 158, 163, 164, 172, 174, 193; 414/729, 414/783
See application file for complete search history.

(56) References Cited

U.S. PATENT DOCUMENTS

| 5,361,485 A | 11/1994 | Baudermann |
| 2003/0221308 A1* | 12/2003 | Hessbruggen ................ 29/563 |

FOREIGN PATENT DOCUMENTS

| DE | 3722180 | 1/1989 |
| DE | 298 15 125 | 12/1998 |
| DE | 19753797 | * 6/1999 |
| DE | 102 43 394 | 4/2004 |

* cited by examiner

*Primary Examiner*—Dana Ross
(74) *Attorney, Agent, or Firm*—Andrew Wilford

(57) ABSTRACT

A workpiece-treating machine has a pair of longitudinally extending and transversely spaced upright walls and a plurality of horizontal transverse webs bridging the walls and forming therewith a rigid elongated frame defining at one longitudinal end a receiving station, at an opposite longitudinal end an output station, between the receiving station and output station a pair of longitudinally spaced working stations, and a transfer station between the working stations. A workpiece is introduced into the frame at the receiving station and taken out at the output station. A guide above all the stations carries mounts shiftable along the guides above the stations. Respective grippers shiftable vertically along vertical rails on the mounts can hold the workpieces in the working stations for action by tools therein and carry the workpieces longitudinally from station to station.

10 Claims, 7 Drawing Sheets

FLEXIBLE TRANSFER MACHINE

CROSS REFERENCE TO RELATED APPLICATIONS

This application is the US national phase of PCT application PCT/DE2005/001018, filed 8 Jun. 2005, published 2 Feb. 2006 as WO 2006/010351, and claiming the priority of German patent application 102004035360.3 itself filed 21 Jul. 2004, whose entire disclosures are herewith incorporated by reference.

FIELD OF THE INVENTION

The invention relates to a transfer machine for the successive machining of workpieces, comprising at least two machining stations and workpiece holders.

BACKGROUND OF THE INVENTION

Transfer machines are known in practice in many variations. They are linked together, for example, by cyclically operating conveying means, such as in the form of rails or transfer bars. In the machines, the machining units are disposed transverse to the feed device. Before a workpiece can perform the next cycle and be replaced by an unmachined piece, the corresponding machining unit must be moved to an idle position. It can only resume its working position when the unmachined workpiece has been positioned and clamped in place. Because of this operating scheme, this mode of operation results in significant nonproductive periods. To reduce the nonproductive time, DE 37 22 180 provides clamping devices opposite one another on both sides of the conveying device. While one clamping device is being loaded and unloaded, the workpiece clamped in the other clamping device is being machined. From DE 41 42 121 A1 (U.S. Pat. No. 5,361,485), we know of a transfer machine for machining differential housings. In the machining stations, work rests comprising clamping and locating mechanisms are provided for the workpieces, the contact areas at which the locating surfaces come in contact with the workpieces being the same in every machining station. This transfer machine is configured specifically for machining differential housings.

OBJECT OF THE INVENTION

It is the object of the present invention to provide a flexible configuration of a transfer machine for machining various workpieces. It is also the object of the invention to reduce the structural complexity and space requirement of the machines and reduce the cycle time required for machining the workpieces.

SUMMARY OF THE INVENTION

The core idea of the invention is to transport the workpieces on a transfer machine according to the pick-up principle from one machining station to the next.

As a result, all machining stations are integrated in a base machine body, which may be configured in a one-part or multipart design. The base machine body comprises at least one support wall. An advantageous embodiment basically includes two support walls that are connected together by connecting webs. The base body may likewise be configured in a section extending orthogonally to the longitudinal axis of H-, L- or U-shape. The base machine body may be configured as one piece or comprise several sections that are joined in a row as needed. In a particularly advantageous embodiment, common guide rails are provided on the base machine body for the workpiece holders above the machining stations, on which rails horizontal carriages are guided for horizontal displacement. The horizontal carriages in turn carry vertical guides for accommodating vertically shiftable carriages. The vertically shiftable carriages receive the workpiece holders. The workpiece holders are provided with devices for the direct gripping, clamping and transporting of workpieces. In a further embodiment of the invention, the workpieces are fixed in clamps, so-called pallets, that the workpiece holders can accommodate. In the machining stations, the required tools, particularly motor-driven tools for drilling, milling, grinding, deburring etc., are provided. In an advantageous embodiment, the tools, particularly multispindle drill heads, are provided on the connecting webs of the base machine body. Likewise, motor-driven tools may be provided in turrets. According to a further embodiment of the invention, the motor-driven tools may be pivoted about an axis orthogonal to the transport direction. The pivot bearings and the drive mechanism for the pivot motion are accommodated in the support walls of the base machine body. Alternately, a pivoting device may be provided on the workpiece holder for pivoting the workpieces.

So as to be able to move the workpiece holder parallel to a second horizontal axis, first and second horizontal carriages are provided according to an advantageous embodiment. Alternatively, the machining unit may be mounted for displacement in the direction of the Y-axis on guides of the base machine frame.

The unmachined workpieces are moved into the effective range of the first workpiece holder using a conveyor. The workpiece holders grab the workpiece and feed it to the first machining station for machining purposes. Following the machining operation, the workpiece is placed in a transfer station and taken over from there by the second workpiece holder. Optionally, the workpiece is fed to further machining stations until all machining steps have been performed. At the end, the workpiece is placed on an output station and moved out of the effective range of the last machining station.

In the transfer machine according to the invention, the transport of the workpiece is implemented via the axes of displacement that are provided in any case for feeding the workpieces. As a result, conventional transport systems can be eliminated and the machining stations can be integrated into a base machine body.

BRIEF DESCRIPTION OF THE DRAWING

The invention will be explained in more detail hereinafter based on illustrated embodiments.

SPECIFIC DESCRIPTION

Figure 1:
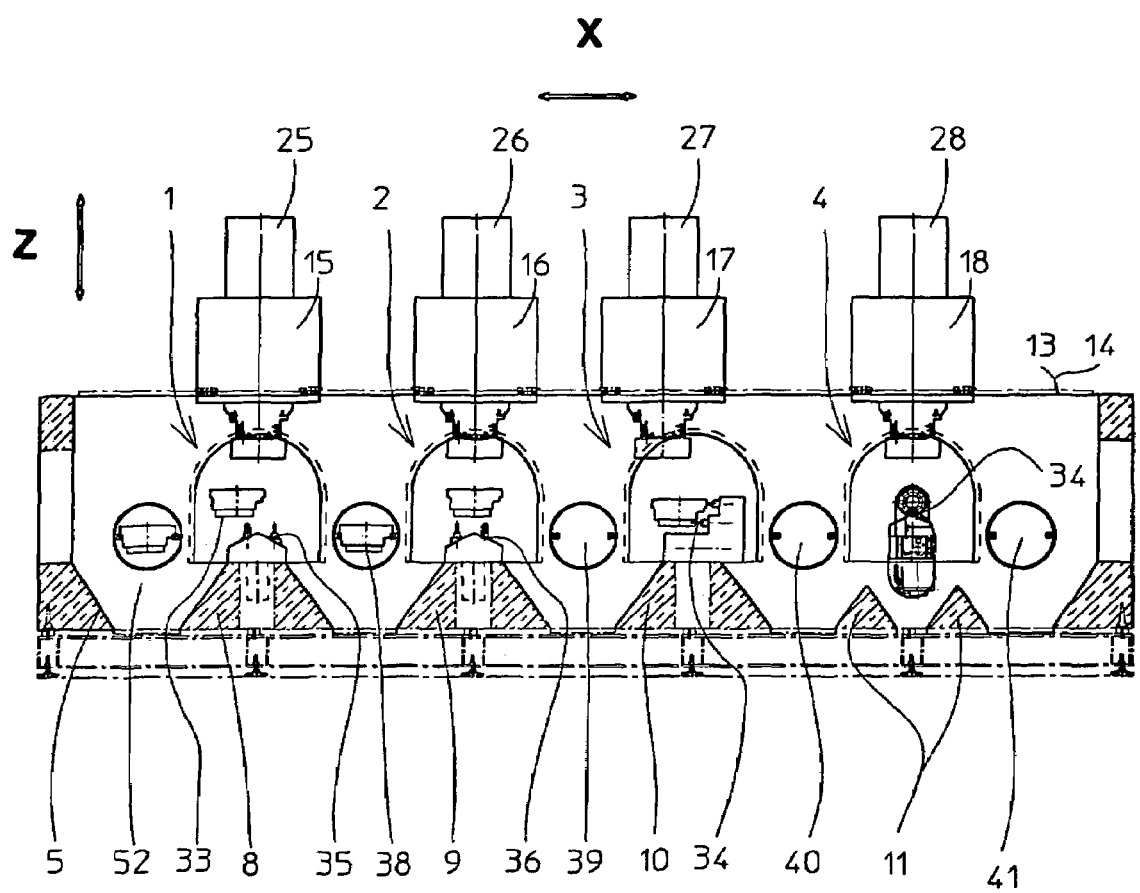
FIG. 1 is a sectional view of a transfer machine according to the invention.
Figure 7:
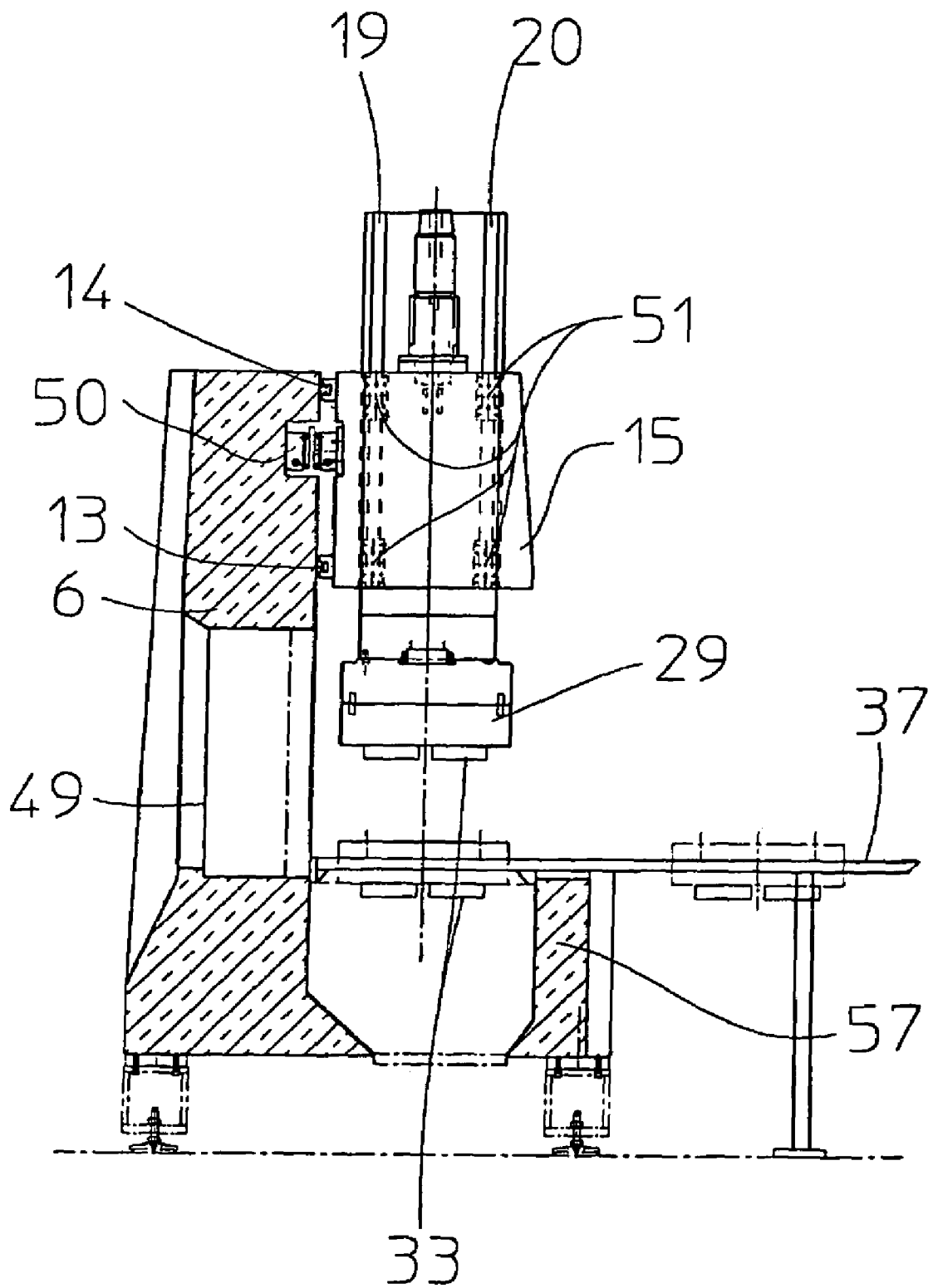
FIG. 7 shows a base machine body with L-shaped cross-section.

FIG. 1 shows a transfer machine with four machining stations. Depending on the number of required machining steps, however, the number of machining stations may also be higher or lower. The machining stations 1, 2, 3, and 4 are integrated in a base machine body 5. It is formed basically by two longitudinal support walls 6 and 7 that are connected together by transverse webs 8, 9, 10, and 11. Workpiece holders 25, 26, 27, and 28 ride on common guide rails 13 and 14 provided on the base machine body 5 above the machining stations 1, 2, 3, and 4, on which rails horizontal carriages 15, 16, 17, and 18 are guided horizontally displaceably. The horizontal carriages 15, 16, 17, and 18 carry guide shoes 51 for guide rails 19 and 20 that vertically guide the workpiece holders 25, 26, 27, and 28. These are provided with clamps 29 for the detachable gripping of workpieces 33 to be machined. In the machining stations 1, 2, 3, and 4, the required tools 34, particularly motor-driven tools for drilling, milling, grinding, deburring etc., are provided. In an advantageous embodiment, multispindle drill heads 35 and 36 are provided on the connecting webs 8 and 9 of the base machine body 5. Likewise, the motor-driven tools 34 may be provided in turrets. The unmachined workpieces 33 are moved into a receiving station 52 in the effective range of the first workpiece holder 25 by a conveyor 37 (FIG. 7). The workpiece holder 25 seizes the workpiece 33 and feeds it to the first machining station 1 for machining purposes. Following the machining operation, the workpiece 33 is placed in a transfer station 38 and taken over from there by the second workpiece holder 26. Optionally, the workpiece 33 is fed via further transfer stations 39 and 40 to further machining stations 2, 3, and 4 until all machining steps have been performed. The receiving station 52, transfer stations 38, 39, and 40, and output station 41 are provided with covers to protect the workpiece being machined from contaminants. Following the last machining step, the workpiece 33 is placed in the output station 41 and taken out of the effective range of the machining station 4.

Figure 2:
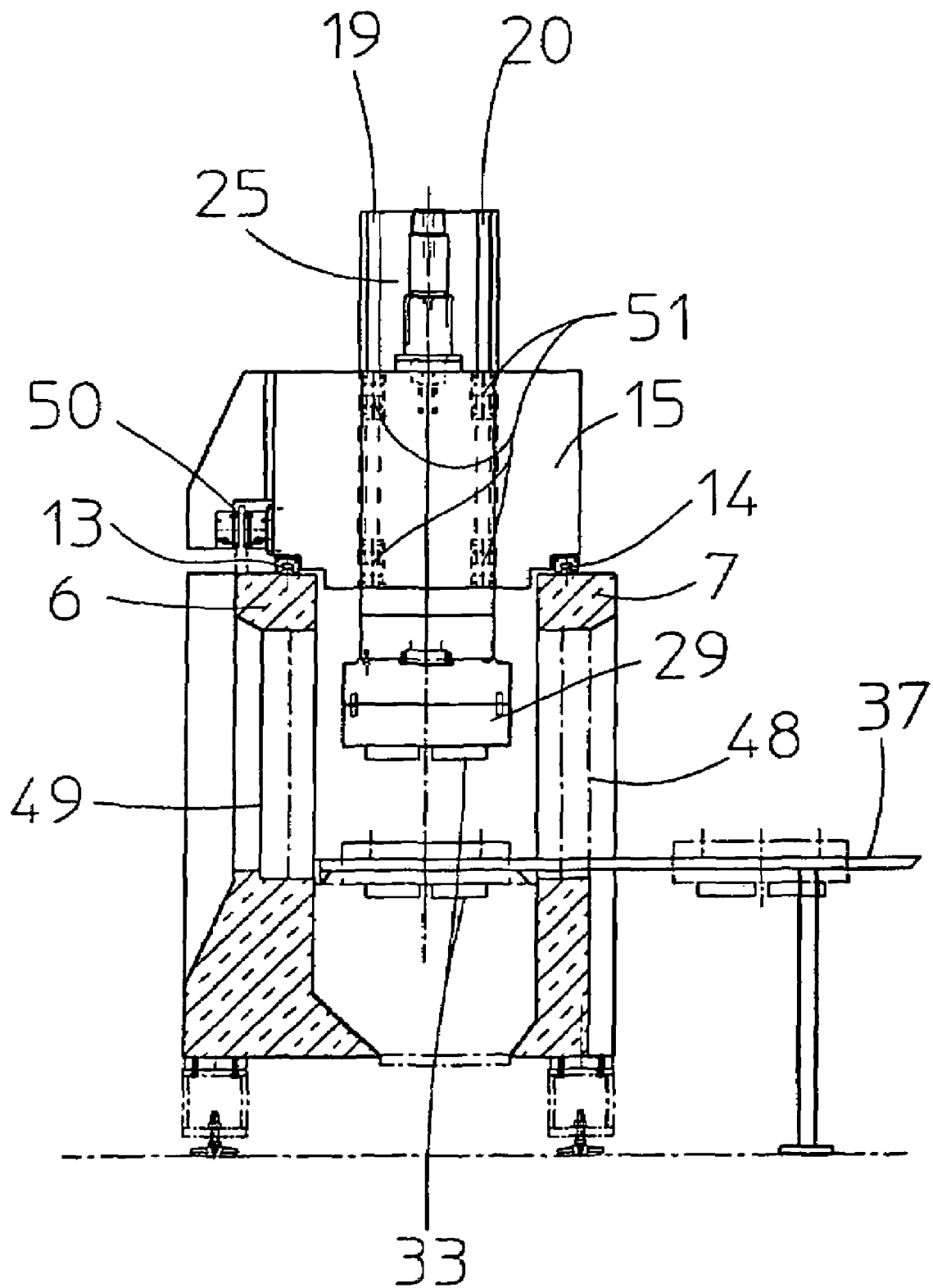
FIG. 2 shows the cross-section of a transfer machine.

FIG. 2 shows a cross-sectional view of the transfer machine. The guide rails 13 and 14 for the horizontal carriages 15, 16, 17, and 18 are provided at the top of the walls 6 and 7. The drive mechanism for the horizontal carriages 15, 16, 17, and 18 is configured as a straight-line drive 50. The walls 6 and 7 have openings 48 and 49 for incoming and outgoing workpieces 33 and for operating and maintaining the machines. The workpieces are transported by the conveyor 37.

Figure 3:
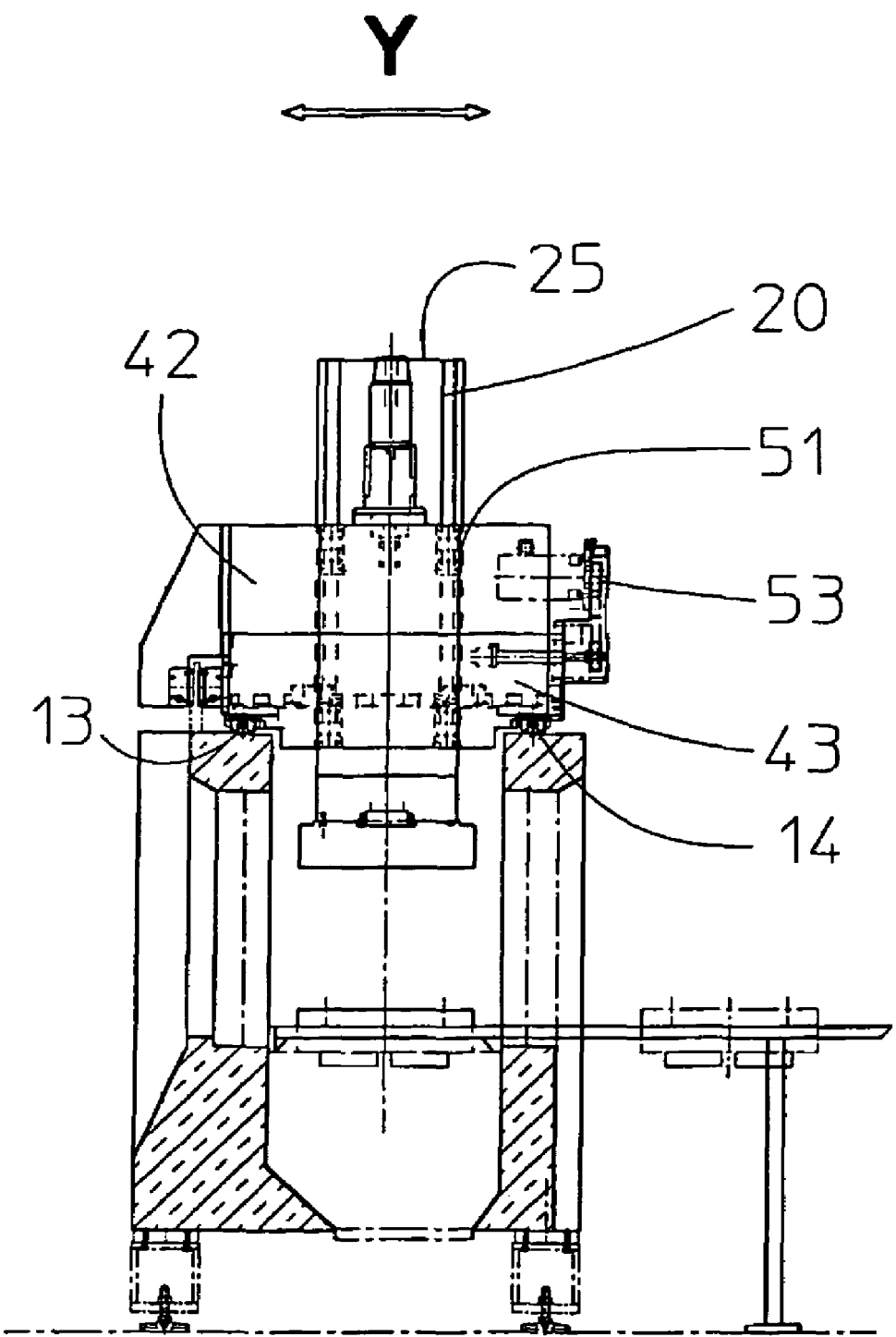
FIG. 3 shows the cross-section of a transfer machine with a Y-axis on the workpiece holder.

In an advantageous embodiment according to FIG. 3, first and second horizontal carriages 42 and 43 are provided, as a result of which the workpiece holders 25, 26, 27, and 28 are displaceable in the horizontal direction along two axes X and Y that run orthogonal to each other. For drive purposes a motor 53 is provided.

Figure 4:
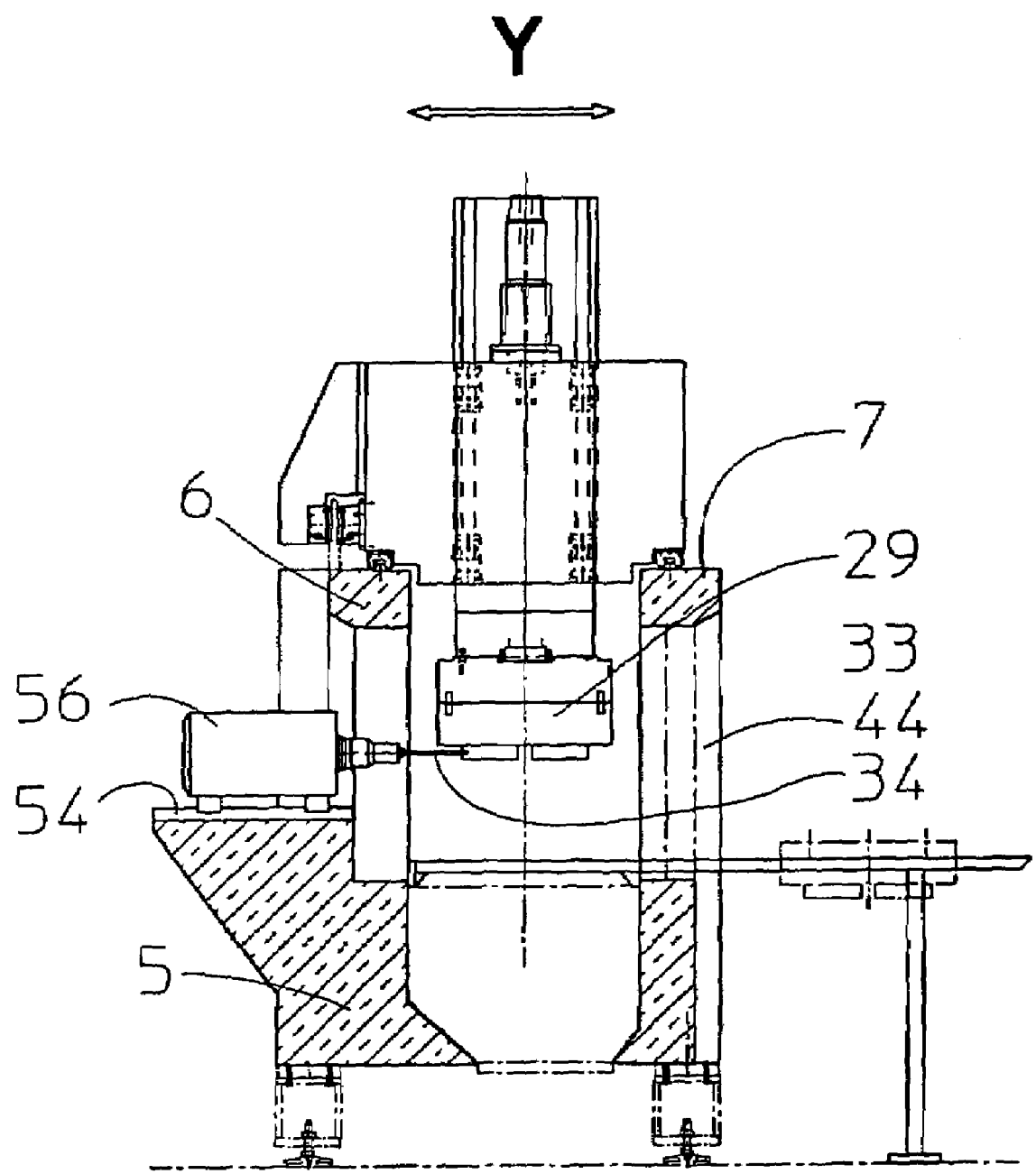
FIG. 4 shows a machining station with Y-axis in the base machine frame.

According to FIG. 4, one machining station is configured as a motor spindle 56 with the tool 34 for displacement in the direction of the Y-axis. The spindle 56 is displaceable on guides 54 in the base machine body 5. The guides 54 can be oriented orthogonal to the main coordinate axes of the machine system, or at any arbitrary angle.

Figure 5:
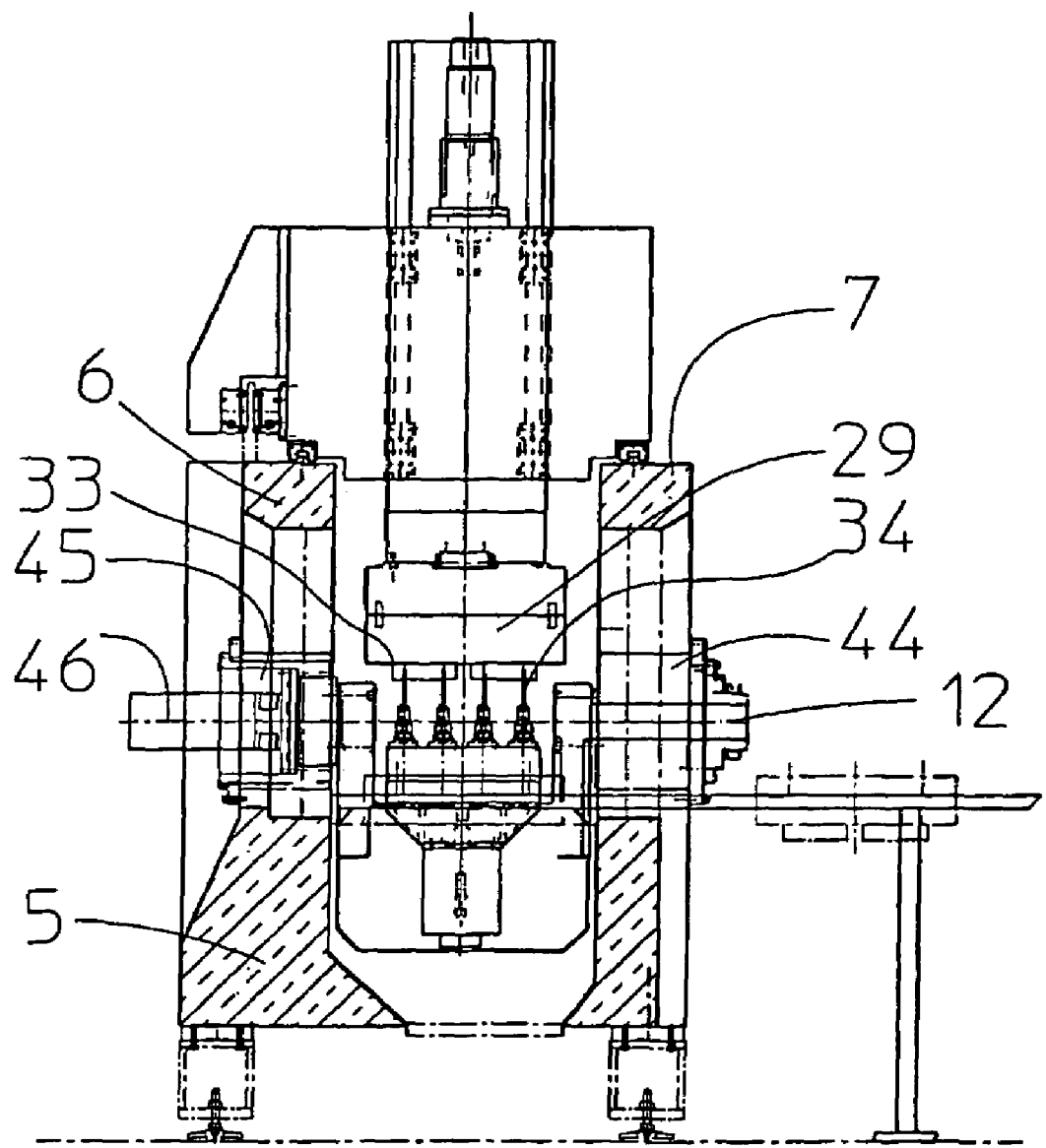
FIG. 5 shows a pivoting machining station.

According to a further embodiment of the invention in FIG. 5, the motor-driven tools 34 can be pivoted about a pivot axis 12 orthogonal to the vertical Z-axis (FIG. 1). The pivot bearings 44 and 45 and the pivot drive mechanism 46 are accommodated in the support walls 6 and 7 of the base machine body 5.

Figure 6:
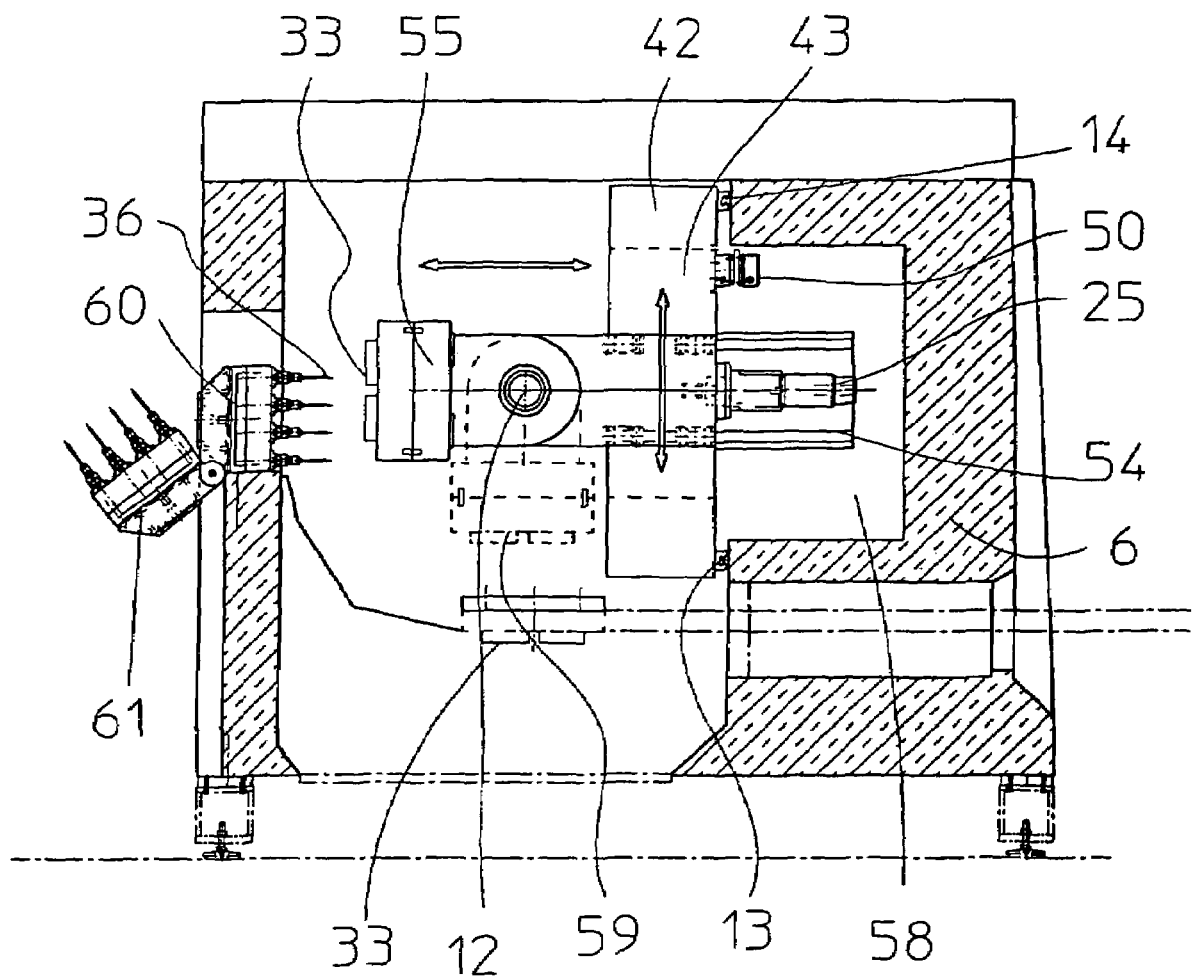
FIG. 6 shows a workpiece holder with pivoting device.

In an equivalent fashion to FIG. 3, in FIG. 6 a horizontal carriage 42 is provided on the base machine body 5. This carriage 42 supports a second carriage 43 comprising guide rails 54 for accommodating the workpiece holder 25. The workpiece holder 25 is provided with a pivoting device 55 for inclining the workpieces 33 about a horizontal pivot axis 12. The pivoting device 55 allows machining of the workpieces 33 at arbitrary angles. Furthermore, the clamping device 29 can be pivoted into a horizontal machining position and into a vertical pick-up position 59. The multispindle drill head 36 is likewise pivotable and can be pivoted from the horizontal machining position 60 into a servicing position 61. In the wall 6 of the base machine body 5, there is a recess 58 for the workpiece holder 25.

FIG. 7 shows a base machine body 5 with L-shaped cross-section. The vertical wall 6 carries the guides 13 and 14 for the horizontal carriage 15. The base plate 57 forms the horizontal side in the L-shaped cross-section. A straight-line drive 50 is provided for driving the horizontal carriages 15. It is positioned between the guides 13 and 14.

The invention claimed is:

1. A workpiece-treating machine comprising:
a pair of longitudinally extending and transversely spaced upright walls and a plurality of horizontal transverse webs bridging the walls and forming therewith a rigid elongated frame defining at one longitudinal end a receiving station, at an opposite longitudinal end an output station, between the receiving station and output station a pair of longitudinally spaced working stations, and a transfer station between the working stations;
means for introducing workpieces into the frame at the receiving station and for taking workpieces out from the frame at the output station;
means including tools in each of the working stations for treating the workpieces;
a guide extending longitudinally above all the stations;
a plurality of mounts shiftable longitudinally along the guides above the stations;
at least one vertical rail on each of the mounts; and
respective gripping means shiftable vertically along the rails and horizontally with the respective mounts through the stations for conveying the workpieces longitudinally from the receiving station through the working and transfer stations to the output station and for holding the workpieces in the working stations for action by tools of the treating means.

2. The machine defined in claim 1, further comprising a common base supporting the frame.

3. The machine defined in claim 2 wherein the frame is in several sections fixed together in a row.

4. The machine defined in claim 1 wherein the guide has longitudinally extending rails on the frame above the work stations, the gripping means each including a mount movable along the rails.

5. The machine defined in claim 4 wherein the mount includes a guide extending horizontally transverse to the rails and a slide carrying a gripper and displaceable horizontally along the guide.

6. The machine defined in claim 1 wherein at least one of the treating means includes a pivotal mount supporting the respective tool for pivoting about a tool-mount axis.

7. The machine defined in claim 6 wherein the tool-mount axis is horizontal.

8. The machine defined in claim 7 wherein the tool-mount axis is horizontal and longitudinal and the tool itself is rotatably driven about an axis generally orthogonal to the tool-mount axis.

9. The machine defined in claim 1 wherein at least one of the treating means includes a multispindle head.

10. The machine defined in claim 1, further comprising covers on the frame protecting and shielding the workpieces in all of the stations.

* * * * *